Dec. 7, 1948.   J. L. CHRISTMANN   2,455,407
VARIABLE SPEED TRANSMISSION
Filed Feb. 21, 1947   5 Sheets-Sheet 1

INVENTOR.
JOHN LOUIS CHRISTMANN
BY
ATTORNEY.

Dec. 7, 1948.  J. L. CHRISTMANN  2,455,407
VARIABLE SPEED TRANSMISSION

Filed Feb. 21, 1947  5 Sheets-Sheet 3

INVENTOR.
JOHN LOUIS CHRISTMANN
BY
ATTORNEY.

Patented Dec. 7, 1948

2,455,407

UNITED STATES PATENT OFFICE 2,455,407

VARIABLE-SPEED TRANSMISSION

John Louis Christmann, Passaic, N. J.

Application February 21, 1947, Serial No. 729,977

19 Claims. (Cl. 74—286)

This invention relates to new and useful improvements in variable speed transmissions.

An old and well known system of varying transmission speeds is by the use of change gears. These gears are merely a set of gears of different diameters. If it were possible to have a gear with a variable diameter it could be advantageously used in transmissions. An important object of this invention resides in providing a simple mechanism which simulates a variable diameter gear, that is, it may be used just as though there were such a thing as a variable diameter gear.

More particularly, the invention proposes in a variable speed transmission an endless loop of chain or band and a supporting mechanism arranged to simulate a gear of variable diameter and used as the variable speed element of the transmission. It is proposed that the endless loop of chain or band be in the nature of a sprocket engaging endless member with a distinct pitch enabling it to engage sprocket gears. The supporting mechanism is arranged to support and hold sections of the endless member upon circumferences of selected diameters and in this way to simulate a gear of variable diameter. This endless member and supporting mechanism and engaging sprockets form the actual variable speed element of the variable speed transmission.

The manner in which input motion is associated with said variable speed element, that is, the simulated gear of variable diameter, and the manner in which motion is delivered to the output of the variable speed transmission may obviously vary. One way to accomplish this is by having the variable speed element form part of a differential, as disclosed in the particular embodiment of the invention described in this specification.

Now that it has been pointed out that the simulated gear of the variable diameter may be used in various ways in variable speed transmissions, specific consideration will be given to the particular design embodied herein, and specific objects and advantages of the design will become apparent as this specification proceeds.

In the accompanying drawings forming a material part of this disclosure.

Figure 4:
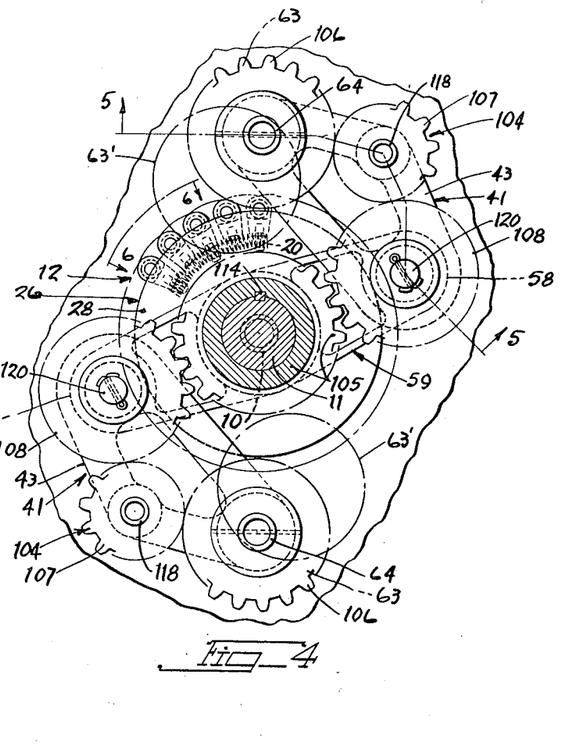
Fig. 4 is a fragmentary transverse vertical sectional view taken on the line 4—4 of Fig. 1.
Figures 5, 6, 7:
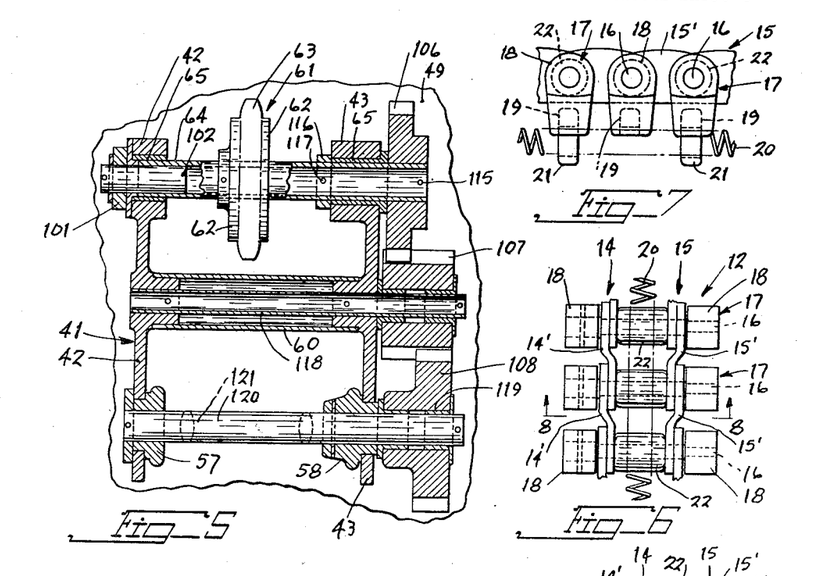
Fig. 5 is a fragmentary developed sectional view taken on the line 5—5 of Fig. 4.
Fig. 6 is a fragmentary elevational view of a portion of the sprocket engaging endless member, used in the transmission, and illustrated per se.
Fig. 7 is a side elevational view of Fig. 6.
Figures 8, 11:
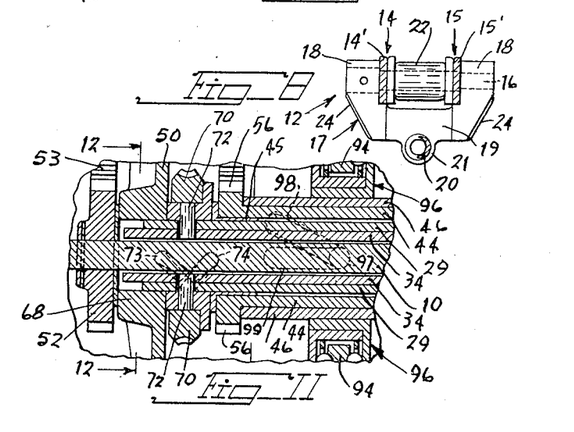
Fig. 8 is a vertical sectional view taken on the line 8—8 of Fig. 6.
Fig. 11 is a fragmentary horizontal sectional view taken on the line 11—11 of Fig. 1.

The variable speed transmission, in accordance with this invention, includes a driving shaft 10 and a driven shaft 11. A sprocket engaging endless member 12 is disposed around an axis which in the particular design of transmission is coaxial with the driving shaft 10 and driven shaft 11. The sprocket engaging endless member 12 may be of varied design and construction. The particular one shown on the drawing is in the nature of a link endless member. Its construction may be best understood by viewing Figs. 4, 6, 7, 8 and 14. The sprocket engaging endless member 12 comprises two lines of links 14 and 15, see Fig. 6. The line of links 14 is composed from links 14' which have overlapping adjacent ends. The line of links 15 is composed of links 15' which also have their ends overlapping. The links 14' and 15' are bent when viewed in plan, as seen in Fig. 6. However this is merely a matter of design. The overlapping ends of the links 14' and 15' are pivotally connected together with pins 16. The end portions of the pins 16 project from the sides of the lines of links 14 and 15.

Yoke-like members 17 are mounted across the projecting ends of said pins 16. Each yoke-like member 17 has end portions 18 engaged upon the ends of one of the pins 16, and a bridge portion 19 connecting the end portions 18. An endless spiral spring 20 is mounted along the bottom portions of the bridge portions 19. Alternate bridge portions 19 are formed with lug-like portions 21 through which the spring 20 passes. The purpose of the spring 20 is to give the endless member 12 a certain amount of resiliency. The endless member 12 is capable of assuming various forms around its axis. For example in Fig. 4 it is illustrated circular, while in Fig. 14 it is illustrated in a shape similar to an ellipse, though not a true ellipse.

A roller 22 is mounted on each pin 16 between the lines of links 14 and 15. It is intended that the teeth of sprocket wheels be capable of engaging in between the rollers 22. For this reason we call the endless member 12 a sprocket engaging endless member. It should be clear that the endless member 12 does not have to be composed of links. It is merely required that it be in band shape and be provided with a pitch for engaging the teeth of sprocket wheels. The yoke-like members 17 also have tapered sides 24 for frictionally engaging cooperating clamping elements, as will be hereinafter more fully described.

The sprocket engaging endless member 12 is associated with support means 26 for supporting and holding sections of said endless member 12 upon circumferences of selected diameters through the axis of the endless member 12, namely, the axes of the shafts 10 and 11. This support means 26 may also be of various designs and constructions provided it properly supports the sprocket engaging endless member 12 as desired. The particular support means 26 illustrated includes a pair of opposed clamping elements 27 and 28 simulating a V-pulley which is split at the center of the V-shape, forming two opposed cones. The tapered sides 24 of the yoke-like members 17 engage between said opposing cones of the opposed clamping elements 27 and 28. The clamping element 27 is longitudinally slidably mounted upon a tube 29. This tube 29 has a flange 30. The periphery of the flange 30 is formed with teeth 31 which engage complementary teeth internally of the clamping element 27 is also provided with teeth 32 which engage complementary teeth on the end of the tube 29. In this way the clamping element 27 is firmly supported to slide a small distance axially.

The clamping element 28 is similarly supported. More particularly, it is slidably axially mounted upon a hub 33 which is threadedly engaged upon a tube 34 positioned internally of the tube 29. A pin 35 permanently locks the hub 33 on the tube 34. The hub 33 is provided with a flange 36 having teeth 37 slidably engaging complementary teeth internally of the clamping member 28. The hub 33 is also provided with teeth 38 which engage complementary teeth on the clamping element 28. Plate springs 39 are engaged in between the flange 30 and clamping element 27, and in between the flange 36 and clamping element 28 for resiliently urging the clamping elements 27 and 28 against the tapered sides 24 of the endless member 12.

Figure 1:
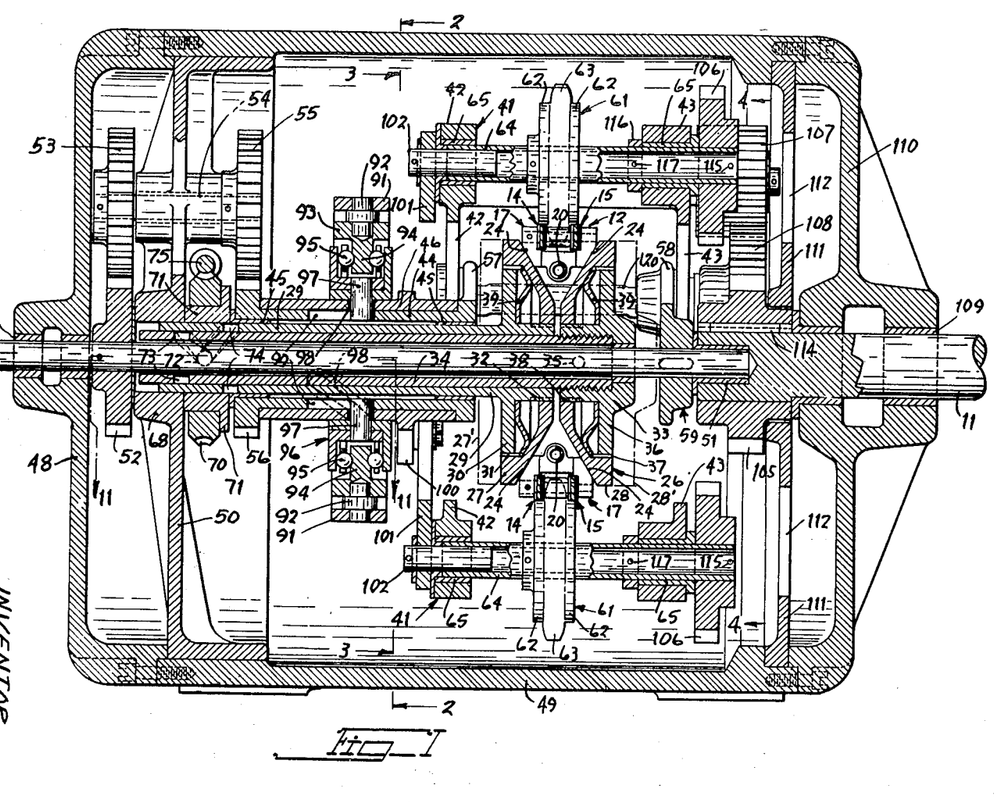
Fig. 1 is a longitudinal vertical central sectional view of a variable speed transmission constructed in accordance with this invention.
Figures 2, 9, 10:
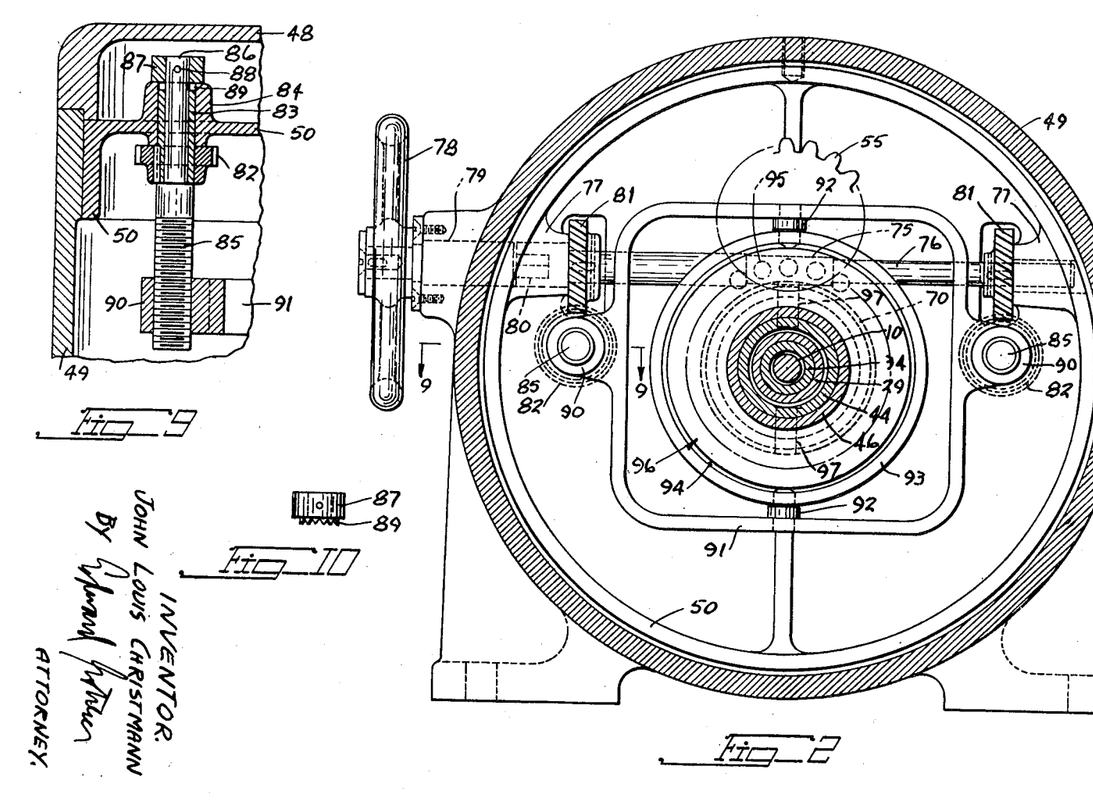
Fig. 2 is a transverse vertical sectional view taken on the line 2—2 of Fig. 1.
Fig. 9 is a fragmentary horizontal sectional view taken on the line 9—9 of Fig. 2.
Fig. 10 is an elevational view of a toothed collar shown in section in Fig. 9.
Figure 13:
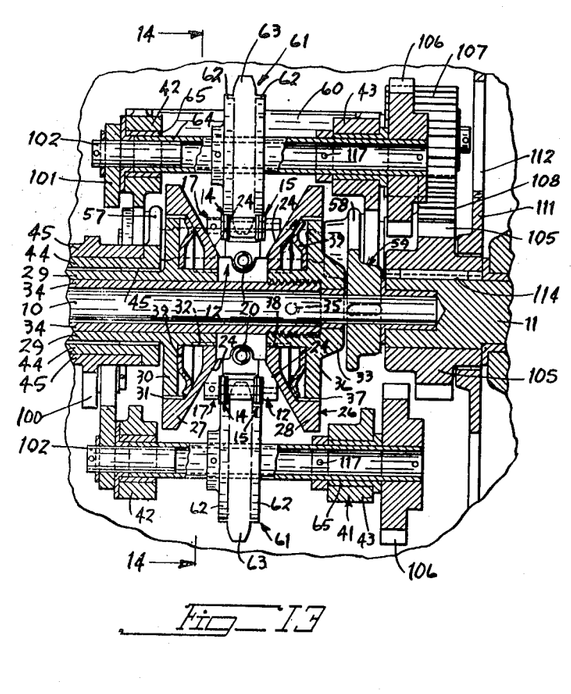
Fig. 13 is a fragmentary sectional view similar to a portion of Fig. 1 but illustrating the parts in a different position, this section being as though taken on the line 13—13 of Fig. 14.
Figure 14:
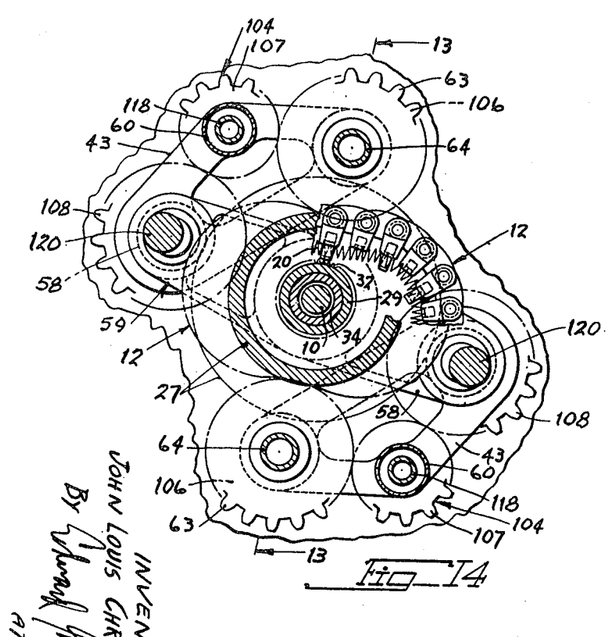
Fig. 14 is a fragmentary transverse sectional view taken on the line 14—14 of Fig. 13.

The clamping elements 27 and 28 are illustrated in Fig. 1 in positions close to each other in which sections of the endless member 12 are held upon a large circumference. In fact, this circumference is so large that the endless member 12 is substantially circular as illustrated in Fig. 4. Of course, the endless member 12 could have been a little bit larger so as not necessarily to be circular. The clamping elements 27 and 28 may be spread apart to the maximum position, indicated by the dot and dash lines 27' and 28' (see Fig. 1) in which position the clamping elements 27 and 28 will be in their maximum spread positions so that the endless member 12 is supported upon a minimum selected diameter. This minimum selected diameter is illustrated in Figs. 13 and 14.

It should be recognized that in all intermediate positions of the clamping elements 27 and 28 the endless member 12 will be supported upon intermediate circumferences. Brackets 41 are rotative about said endless member 12 and about its axis. Each of the brackets 41 includes bracket side members 42 and 43 positioned to the sides of the clamping elements 27 and 28 and suitably supported, as will be hereinafter described in greater detail.

Drive means connects the driving shaft 10 and said brackets 41 for rotating said brackets 41 around said sprocket engaging endless member 12. This drive means includes a tube 44 rotatively supported by sleeve bearings 45 upon the tube 29, and a tube 46 turnably mounted upon the tube 44. The driving shaft 10 is rotatively supported by a sleeve bearing 47 mounted upon an end cap 48 of a casing 49 for the transmission. A transverse support plate 50 is mounted within the casing 49 and is spaced a short distance from the end cap 48. The driving shaft 10 engages through the tube 34. Its inner end is rotatively supported by a sleeve bearing 51 mounted in the inner end of the driven shaft 11. A gear 52 is mounted upon the driving shaft 10 between the support plate 50 and the end cap 48 and meshes with a gear 53 fixedly mounted on a countershaft 54 rotatively supported in a bearing upon the support plate 50. The shaft 54 is provided with another gear 55 which meshes with a gear 56 connected with the tube 44 by which rotations from the driving shaft 10 will be transmitted to rotate the tube 44, and also the tube 46, as will be hereinafter more fully explained.

The tube 44 is provided with lugs 57 upon which the bracket side members 42 are pivotally mounted at one of their ends. The bracket side members 43 are pivotally mounted at their corresponding ends upon lugs 58 mounted on a lug member 59 which is fixedly mounted on the shaft 10. Intermediate of their ends the bracket side members 42 and 53 are connected together in a rigid unit with a tubular member 60.

The brackets 41 are provided with clamp means 61 for engaging sections of said endless member 12 against said support means 26 at selected diameters, whereby rotations of said brackets 41 will cause said clamp means 61 to travel around said support means 26 and engage all sections of the endless member 12 progressively around said selected diameter. Said clamp means 61 is in the nature of cylindrical projections 62 upon the sides of sprocket wheels 63 mounted upon tubular shafts 64 rotatively supported in sleeve bearings 65 upon the bracket side members 42 and 43. The cylindrical projections 62 are coaxial of the shafts 64. The cylindrical projections 62 engage the lines of links 14 and 15 of the endless member 12 forcing sections of the endless member 12 in between the clamping elements 27 and 28 against the resilient action of the plate springs 39.

Figure 12:
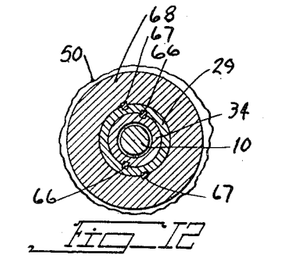
Fig. 12 is a fragmentary transverse sectional view taken on the line 12—12 of Fig. 11.

The tubes 34 and 29 are non-rotative. They are connected with each other by keys 66, see Fig. 12, and the outermost tube 29 is connected by keys 67 with a hub 68 formed upon the support plate 50. It is pointed out that the keys 66 and 67 permit the tubes 29 and 34 to move axially, which is necessary for adjustment of the clamping elements 27 and 28 in relation to each other as already pointed out. Because of the keys 66 and 67 the support means 26 is stationary, that is, non-rotative. When the brackets 41 rotate around the endless member 12 they indirectly wrap and unwrap the endless member 12 about the support means 26 at tangent points; that is, at points where the sections of the endless member which are located on the circumferences of selected diameters engage the clamping elements 27 and 28. This may be better understood by examining Fig. 14 and noting that the endless member 12 will wrap on to the support means 26 in front of the tangent points and will unwrap to the rear of the tangent points. The endless spring 20 will cause the endless member 12 to unwrap to the rear of the tangent points while pressure by the cylindrical projections 62 will cause portions of the endless member 12 in front of the tangent points to be forced downwards and wrap on to the support means 26. The teeth of the sprocket gear 63 will engage in between the rollers 22 as the brackets 41 rotate around the endless member 12.

Means is provided for simultaneously adjusting the support means 26 and the brackets 41 for all selected diameters. The clamping elements 27 and 28 are adjusted by a worm gear 70 which is fixedly mounted upon a collar 71 rotative on the tube 29. The collar 71 is provided with radially projecting pins 72, see Fig. 11, which engage in angular slots 73 and 74 formed respectively in the tubular members 34 and 29. These angular slots 73 and 74 will cause the tubular members 29 and 34 to move simultaneously right and left, or left and right, respectively, depending upon which direction the worm wheel 70 is turned. A worm 75 meshes with the worm wheel 70 and is mounted on a shaft 76 which is rotatively supported in bearings 77 mounted on the support plate 50. A handle wheel 78 is connected with one end of the shaft 76 by which the shaft 76 may be turned in one direction or the other. The hand wheel 78 is mounted upon a hand wheel stem 79 which has a square portion 80 which engages a square recess in the end of the shaft 76.

Helical gears 81 are mounted on the shaft 76 and mesh with helical gears 82 mounted on tubes 83 turnably supported in bosses 84 formed on the supporting plate 50. Screws 85 are parallel to each other and longitudinal of the driving shaft 10 and are provided with stem portions 86 which pass through the tubes 83. A toothed collar 87 is attached upon each stem 86 with a pin 88. These toothed collars 87 are provided with teeth 89 which engage complementary teeth formed upon the ends of the tubes 83. Rotations of the helical gears 82 will drive the screws 85. However, the pins 88 may be removed and the helical gears 82 may be turned to adjust the screws 85 to selected positions.

The screws 85 threadedly engage lugs 90 upon a frame 91 encircling the tubes 44 and 46. The frame 91 is provided with trunnion elements 92 which engage a ring 93 The ring 93 has an internal flange 94 engaged by thrust bearings 95 mounted upon a flanged member 96 which is provided with pins 97 engaging angular slots 98 formed in the tube 46. The pins 97 also engage longitudinal slots 99 formed in the tube 44 When the screws 85 move the frame 91 forwards or rearwards, the motion will be indirectly communicated to the pins 97 which because of the slots 98 and 99 will turn the tube 46 in relation to the tube 44. The tube 46 is provided with lugs 100. Links 101 pivotally connect with the lugs 100 and with studs 102 mounted in one of the ends of the tubes 64. The dot and dash lines 101' in Fig. 3 indicate the distance through which the links 101 are moved when the tube 46 is turned because of the pins 97 and slots 98 and 99. The links 101 serve to pivot the brackets 41 on the lugs 57 and serve to maintain the sprockets 63 and the cylindrical projections 62 in contact with the sprocket engaging endless member 12 in all adjusted positions of the support means 26. Thus the clamp means 61 maintains sections of the endless member 12 against said support means 26 for all adjusted positions of the support means.

It is pointed out that the brackets 41 and sprockets 63 are indirectly driven by the driving shaft 10, and rotate around the endless member 12 in the nature of the input side of a differential. The endless member 12 simulates the central gear of the differential and the sprockets 63 the planetary gears. The output side of the differential is utilized for delivering rotations to the driven shaft 11. This output side of the differential includes the sprockets 63, trains of gears 104, and a center gear 105 mounted upon the driven shaft 11. Each of the trains of gears 104 includes a gear 106 mounted upon one of the tubular members 64 and meshing with a gear 107 mounted upon one of the brackets 41, which in turn meshes with a gear 108 also mounted on the bracket 41. Each gear 108 meshes with the central gear 105. The driven shaft 11 is supported in a sleeve bearing 109 mounted upon an end cap 110 which is attached to the casing 49. A support plate 111 is mounted between the end plate 110 and the adjacent end of the casing 49. This support plate 111 has several openings 112. The support plate 111 is useful in the assembling and taking apart of the transmission. When the end cap 110 is removed the support plate 111 will continue to indirectly support the driven shaft 11. The center gear 105 is connected with the driven shaft 11 by a key 114. The gears 106 are mounted upon the tubular member 64 with pins 115. Washers 116 are attached to the tubular members 64 with pins 117 and assist in properly holding the tubular members 64 on the brackets 41.

The gears 107 are rotatively mounted upon shafts 118 which are mounted between the bracket side members 42 and 43 within the tubes 60. The gears 108 are rotatively mounted on sleeve bearings 119 which are mounted on rods 120 connected between the bracket side members 42 and 43. The rods 120 have central bent portions 121 to provide sufficient space for the endless member 12 during the operation of the transmission. Oil may be held in the casing 49 and end caps 48 and 110 so that the differential may run in oil.

The operation of the device may be understood from the following:

Rotations of the driving shaft 10 are transmitted to indirectly rotate the brackets 41 around the endless member 12. The brackets 41 are driven by the lug member 59 mounted on the driving shaft 10 and connected with the brackets 41, and furthermore by the gears 52, 53, 55 and 56. The gear 56 drives the tubes 44 and 46 which in turn support the brackets 41 because of the lugs 57 and the links 101. When the brackets 41 rotate about the endless member 12, the clamp means 61 carried by the brackets 41 will engage sections of the endless member 12 against the support means 26 at a selected diameter depending upon the adjustment of the support means 26. The rotations of the brackets 41 will cause the clamp means 61 to travel around the support means 26 and engage all sections of the endless member 12 progressively around the selected diameter. The clamp means 61 include cylindrical projections 62 which engage the endless member 12 at tangent points. The endless member 12 will be wrapped downwards against the support means 26, as the clamp means 61 rotate, and sections of the endless member 12 behind the tangent points will unwrap from the clamp means 26 because of the spring 20. The endless member 12 performs a wrapping on and wrapping off operation on the support means 26, and in so doing moves around the support means 26 at a speed proportional to the difference in diameters between the endless member 12 and the support means 26. It is held stationary by the clamping elements 27 and 28 which engage the tapered side portions 24 of the yoke-like members 17 of the endless member 12. The endless member 12 may have large loose portions, as illustrated in Fig. 14, when the support means 26 is fully expanded, or the endless member 12 may be substantially circular with no loose portions, as illustrated in Fig. 4, when the clamp means 26 is fully contracted. In intermediate positions the endless member 12 will assume intermediate conditions.

In order to follow the transmission of rotations let us assume R to be the radius of the pitch diameter of the sections on a selected diameter of the endless member 12 when the clamp elements 27 and 28 are in their contracted positions. Let us assume that the radius of the pitch diameter of the sprockets 63 and gears 108 are $\frac{2}{3}R$, and that the output central gear 105 is also $\frac{2}{3}R$. It must be clear that this is merely by way of example and the gears could be other sizes. Now then, with the ratio specified by mathematical calculations it has been found that for each revolution of the driving shaft 10 the driven shaft 11 will rotate ½ revolution. It should be noted that the sprockets 63 are rotating around a circumference having a radius of R, while the gears 108 which are of the same pitch diameter as the sprockets 63 are rotating around a circumference having a radius of $\frac{2}{3}R$. Because of this the output differential will be transmitting the ½ revolution at the driven shaft 11.

Figure 3:
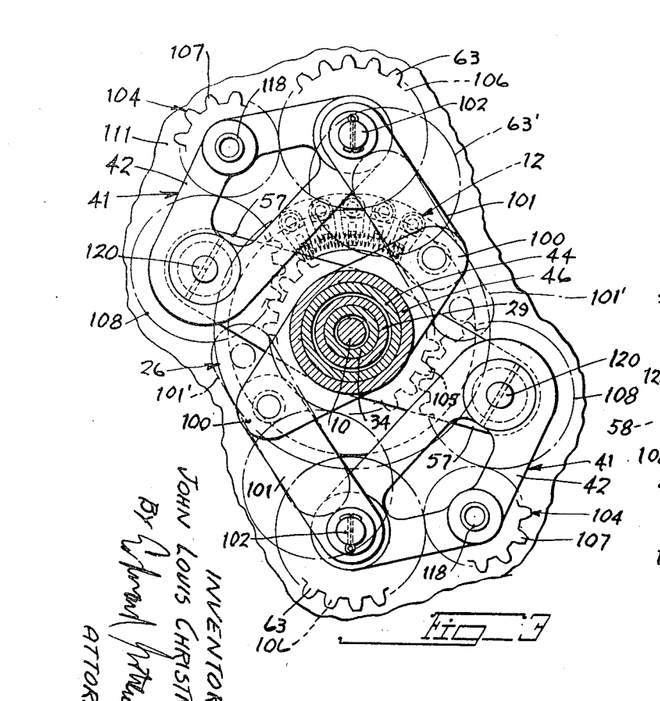
Fig. 3 is a fragmentary transverse vertical sectional view taken on the line 3—3 of Fig. 1.

We may change the delivery speed by turning the handle 78. The handle 78 indirectly turns the shaft 76 which causes the worm 75 to rotate the member 70, and the pins 72 carried by the member 70 and acting in the slots 73 and 74 of the tubes 29 and 34 will separate the clamping members 27 and 28. Simultaneously, the helical gears 81 on the shaft 76 will indirectly drive the screws 85, which will cause the frame 91 and ring 93 to move, and through thrust bearing 95 move the flanged member 96 and so indirectly move the pins 97 which work in the slots 98 and 99. Because the slots 98 are at an angle, the tube 46 will be turned, which motion will be transmitted by the lugs 100 and links 101 to correspondingly pivot the brackets 41. The brackets 41 will pivot about the rods 120 so as to maintain the clamping means 61 against the endless member 12 forcing the endless member 12 down in between the clamping elements 27 and 28 as they are being moved apart. In Fig. 3 reference numeral 101' indicates the position of the maximum movement of the links 101 and the dot and dash line circle 63' in Figs. 3 and 4 indicates the position of maximum motion of the sprockets 63 corresponding with the maximum motion of the links 101'.

By mathematical calculations it has been determined that when the pitch diameter of the selected circumferences of the sections of the endless member 12 is at a selected diameter corresponding with $\frac{2}{3}R$ the driven shaft 11 will rotate ¼ of a revolution for each revolution of the driving shaft 10. When the pitch diameter of the selected circumference reaches a position in which the sections of the endless member 12 are at a diameter corresponding with $\frac{2}{3}R$ then the driven shaft 11 will remain stationary while the driving shaft 10 rotates. The reason for this is quite obvious when we realize that now the diameter of the simulated gear of the endless member 12 corresponds exactly in diameter with the center gear 105, and the gears 108 are of the same diameter as the sprockets 63.

The friction elements, the tapered ends 24 against the clamping elements 27 and 28 have to transmit only the small input torque at high speed. The high output torque at low speed is transmitted through the output differential. Since the endless member 12 is at rest at the tangent points with the clamping elements 27 and 28, friction of rest is prevalent at these points and relatively small pressure is required between the endless member 12 and the clamping elements to prevent slippage. The output speeds of the transmission vary in direct proportion to the turns of the speed regulating handwheel 78, a feature important for control purposes. (After calibration curves can be obtained according to the shape of the clamping element surfaces, which in the present case are cones.)

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft.

2. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said sprocket engaging endless member including links pivotally connected with each other, and resilient means for urging said links outwards after said links have been flexed inwards.

3. In a variable speed transmission having a driving and a driven shaft, a sprocket engaging endless member disposed around an axis, and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said sprocket engaging endless member including two spaced lines of links having the ends of succeeding links overlapping, pins mounted transversely between said two spaced lines of links and engaging through said overlapping ends and pivotally connecting the links, yoke-like members mounted upon said pins and having tapered sides, rollers upon said pins between said lines of links, and resilient means mounted between said links for urging them outwards after said links have been flexed inwards.

4. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said sprocket engaging endless member having elements with a pitch adapted for engagement with said sprocket wheel.

5. In a variable speed transmission having a driving and a driven shaft, a sprocket engaging endless member disposed around an axis, and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said sprocket engaging endless member including two spaced lines of links having the ends of succeeding links overlapping, pins mounted transversely between said two spaced lines of links and engaging through said overlapping ends and pivotally connecting the links, yoke-like members mounted upon said pins and having tapered sides, rollers upon said pins between said lines of links, and resilient means mounted between said links for urging them outwards after said links have been flexed inwards, said support means including clamping elements adjustably mounted axially and cooperative with said tapered sides of said endless member.

6. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said sprocket engaging endless member including two spaced lines of links having the ends of succeeding links overlapping, pins mounted transversely between said two spaced lines of links and engaging through said overlapping ends and pivotally connecting the links, yoke-like members mounted upon said pins and having tapered sides, rollers upon said pins between said lines of links, and resilient means mounted between said links for urging them outwards after said links have been flexed inwards, said support means including clamping elements adjustably mounted axially and cooperative with said tapered sides of said endless member, said clamping elements including a split V-pulley which is split at the center of the V-shape forming two opposed cones upon and between which said endless member may engage.

7. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said sprocket engaging endless member including two spaced lines of links having the ends of succeeding links overlapping, pins mounted transversely between said two spaced lines of links and engaging through said overlapping ends and pivotally connecting the links, yoke-like members mounted upon said pins and having tapered sides, rollers upon said pins between said lines of links, and resilient means mounted between said links for urging them outwards after said links have been flexed inwards, said support means including clamping elements adjustably mounted axially and cooperative with said tapered sides of said endless member, said clamping elements including a split V-pulley which is split at the center of the V-shape forming two opposed cones upon and between which said endless member may engage, and resilient means urging said clamping members towards each other for frictionally engaging said tapered sides of said endless member.

8. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, tubes coaxially mounted on said driving shaft and provided with lugs positioned to one side of said support means, lugs mounted on said driving shaft and positioned to the other side of said support means, and said bracket including bracket side members positioned on opposite sides of said support means and pivotally connected respectively with said first and second named lugs.

9. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, means for adjusting said support means for selecting a circumference of said support means for said endless member, said clamp means having an axis spaced from said sections of said endless member at said selected diameter, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, tubes coaxially mounted on said driving shaft and provided with lugs positioned to one side of said support means, lugs mounted on said driving shaft and positioned to the other side of said support means, and said bracket including bracket side members positioned on opposite sides of said support means and pivotally connected respectively with said first and second named lugs, said drive means, including means for driving said tubes at the same speed as said driving shaft.

10. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said clamp means including clamping elements consisting of a split V-pulley which is split at the center of the V-shape forming two opposed cones, and said means for adjusting said support means including means for separating or moving together said clamping elements.

11. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said clamp means including clamping elements consisting of a split V-pulley which is split at the center of the V-shape forming two opposed cones, and said means for adjusting said support means including means for separating or moving together said clamping elements, including tubular members coaxially of the driving shaft and connected respectively with said clamping elements, inclined slots formed in said tubular members, a member rotative upon said tubular members and having pins engaging in said inclined slots, and means for turnably adjusting said member with the pins.

12. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, clamp means on said bracket for engaging a section of said endless member against said support means at a selected diameter whereby rotations of said bracket will cause said clamp means to travel around said support means and engage all sections of said endless member progressively around said selected diameter, said clamp means having an axis spaced from said sections of said endless member at said selected diameter, means for adjusting said support means for selecting a circumference of said support means for said endless member, means for adjusting said bracket for causing said clamp means to maintain a section of said endless member against said support means for all adjusted positions of said support means, a driven sprocket mounted on said clamp means coaxial of said axis of said clamp means and engaging said endless member at said selected diameter, and drive means connecting said driven sprocket and said driven shaft, said means for adjusting said support means and said means for adjusting said bracket being operative by a common handle for simultaneous operation.

13. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, a sprocket wheel rotatively supported on said bracket and engaging a section of said endless member against said support means whereby rotations of said bracket will cause said sprocket wheel to travel around said support means and engage all sections of said endless member progressively around a selected circumference of said support means for rotating said sprocket wheel at a speed depending upon the diameter of said circumference, means for transmitting axial rotations of said sprocket wheel to said driven shaft, means for adjusting said support means for selecting a circumference for said endless member, and means for adjusting said bracket for maintaining the connection between said sprocket wheel and said endless member in all adjusted positions of said support means.

14. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, a sprocket wheel rotatively supported on said bracket and engaging a section of said endless member against said support means whereby rotations of said bracket will cause said sprocket wheel to travel around said support means and engage all sections of said endless member progressively around a selected circumference of said support means for rotating said sprocket wheel at a speed depending upon the diameter of said circumference, means for transmitting axial rotations of said sprocket wheel to said driven shaft, means for adjusting said support means for selecting a circumference for said endless member, and means for adjusting said bracket for maintaining the connection between said sprocket wheel and said endless member in all adjusted positions of said support means, said means for transmitting axial rotations of said sprocket wheel to said driven shaft including a gear transmission.

15. In a variable speed transmission having a driving and a driven shaft, a sprocket engaging endless member disposed around an axis and having elements for meshing with the teeth of a sprocket, support means having circumferences coaxial of said axis and of different diameters for supporting and holding sections of said endless member upon selected circumferences of selected diameters through said axis, a bracket rotative about said endless member and about said axis, drive means connecting said driving shaft and said bracket for rotating said bracket, a sprocket wheel rotatively supported on said bracket and engaging a section of said endless member against said support means whereby rotations of said bracket will cause said sprocket wheel to travel around said support means and engage all sections of said endless member progressively around a selected circumference of said support means for rotating said sprocket wheel at a speed depending upon the diameter of said circumference, means for transmitting axial rotations of said sprocket wheel to said driven shaft, means for adjusting said support means for selecting a circumference for said endless member, and means for adjusting said bracket for maintaining the connection between said sprocket wheel and said endless member in all adjusted positions of said support means, said rotating bracket and said sprocket wheel and said sprocket engaging endless member comprising a differential, said bracket being the input side of said differential, said endless member moving around said support means at a speed depending on said selected circumference, and said endless member and said sprocket wheel being the output side of said differential.

16. In a variable speed transmission having a driving and a driven shaft, a planetary gear having a central gear fixed on said driven shaft, a sprocket engaging endless member disposed substantially axially of said central gear and in a plane at right angles to the axis of said central gear and having elements for meshing with the teeth of a sprocket, support means having circumferences coaxial of said axis and of different diameters within said endless member for supporting and holding sections of said endless member upon selected circumferences of selected diameters, a planetary bracket rotative about said endless member, drive means connecting said driving shaft and said planetary bracket for rotating said bracket, a sprocket wheel rotatively supported on said bracket and engaging a section of said endless member against said support means whereby rotations of said bracket will cause said sprocket wheel to travel around said support means and engage all sections of said endless member progressively around a selected circumference of said support means for rotating the sprocket wheel at a speed depending upon the diameter of said circumference, a gear train mounted on said bracket and connecting with said sprocket and having a gear engaging said central gear, means for adjusting said support means for selecting a circumference of said support means for said endless member, and means for adjusting said bracket for maintaining the connection between said sprocket wheel and said endless member in all adjusted positions of said support means.

17. In a variable speed transmission having a driving and a driven shaft, a planetary gear having a central gear fixed on said driven shaft, a sprocket engaging endless member disposed substantially axially of said central gear and in a plane at right angles to the axis of said central gear and having elements for meshing with the teeth of a sprocket, support means having circumferences coaxial of said axis and of different diameters within said endless member for supporting and holding sections of said endless member upon selected circumferences of selected diameters, a planetary bracket rotative about said endless member, drive means connecting said driving shaft and said planetary bracket for rotating said bracket, a sprocket wheel rotatively supported on said bracket and engaging a section of said endless member against said support means whereby rotations of said bracket will cause said sprocket wheel to travel around said support means and engage all sections of said endless member progressively around a selected circumference of said support means for rotating the sprocket wheel at a speed depending upon the diameter of said circumference, a gear train mounted on said bracket and connecting with said sprocket and having a gear engaging said central gear, means for adjusting said support means for selecting a circumference of said support means for said endless member, and means for adjusting said bracket for maintaining the connection between said sprocket wheel and said endless member in all adjusted positions of said support means, and said means for adjusting said support means and said means for adjusting said bracket being connected for simultaneous operation.

18. In a variable speed transmission having a driving and a driven shaft, a planetary gear unit having a sun gear fixed on said driven shaft, a non-rotative split V-pulley coaxially of said sun gear, a sprocket engaging endless member engaging loosely around said V-pulley and having elements for meshing with the teeth of a sprocket, a planetary bracket rotative about said endless member, drive means connecting said driving shaft and said planetary bracket for rotating said bracket, a sprocket wheel rotatively supported on said bracket and engaging said endless member at one point and forcing an area of said endless member frictionally against said V-pulley, a gear train mounted on said bracket and connecting with said sprocket and having a gear engaging said sun gear, means for adjusting said split V-pulley for changing the radius of support of said endless member, and means for adjusting said bracket for maintaining the connection between said sprocket wheel and said endless member in all adjusted positions of said V-pulley.

19. In a variable speed transmission having a driving and a driven shaft, a planetary gear unit having a sun gear fixed on said driven shaft, a non-rotative split V-pulley coaxially of said sun gear, a sprocket engaging endless member engaging loosely around said V-pulley and having elements for meshing with the teeth of a sprocket, a planetary bracket rotative about said endless member, drive means connecting said driving shaft and said planetary bracket for rotating said bracket, a sprocket wheel rotatively supported on said bracket and engaging said endless member at one point and forcing an area of said endless member frictionally against said V-pulley, a gear train mounted on said bracket and connecting with said sprocket and having a gear engaging said sun gear, means for adjusting said split V-pulley for changing the radius of support of said endless member, and means for adjusting said bracket for maintaining the connection between said sprocket wheel and said endless member in all adjusted positions of said V-pulley, said means for adjusting said split V-pulley, and said means for adjusting said bracket being connected for simultaneous operation.

JOHN LOUIS CHRISTMANN.

REFERENCES CITED

The following references are of record in the file of this patent:

UNITED STATES PATENTS

| Number | Name | Date |
|---|---|---|
| 691,789 | Mann | Jan. 28, 1902 |
| 2,101,845 | Fraser | Dec. 14, 1937 |

FOREIGN PATENTS

| Number | Country | Date |
|---|---|---|
| 393,170 | Great Britain | June 1, 1933 |